(12) United States Patent
Pultz (10) Patent No.: US 12,291,280 B2
(45) Date of Patent: May 6, 2025

(54) OFF-ROAD VEHICLE STEERING RACK ASSEMBLY

(71) Applicant: 74 Weld Inc., El Cajon, CA (US)

(72) Inventor: Quinn Pultz, Encinitas, CA (US)

(73) Assignee: 74 WELD INC., El Cajon, CA (US)

( * ) Notice: Subject to any disclaimer, the term of this patent is extended or adjusted under 35 U.S.C. 154(b) by 0 days.

(21) Appl. No.: 18/777,440

(22) Filed: Jul. 18, 2024

(65) Prior Publication Data

US 2025/0026398 A1    Jan. 23, 2025

Related U.S. Application Data

(60) Provisional application No. 63/527,455, filed on Jul. 18, 2023.

(51) Int. Cl.
   *B62D 3/12*    (2006.01)
(52) U.S. Cl.
   CPC .................................. *B62D 3/126* (2013.01)
(58) Field of Classification Search
   CPC . F16H 2055/281; F16H 55/283; B62D 3/123; B62D 3/12; B62D 3/126
   See application file for complete search history.

(56) References Cited

U.S. PATENT DOCUMENTS

| | | | | |
|---|---|---|---|---|
| 5,285,864 A | * | 2/1994 | Martin | B62D 3/12 180/428 |
| 9,995,337 B2 | * | 6/2018 | Ikeda | F16C 35/02 |
| 10,926,789 B2 | * | 2/2021 | James | F16H 55/283 |
| 10,933,904 B2 | * | 3/2021 | Muehling | F16C 29/02 |
| 11,485,402 B2 | * | 11/2022 | Negishi | B62D 3/12 |
| 11,767,052 B2 | * | 9/2023 | Ko | B62D 5/0421 280/93.502 |
| 11,958,539 B2 | * | 4/2024 | Heo | F16H 55/28 |
| 2017/0130769 A1 | * | 5/2017 | Ikeda | F16C 35/02 |
| 2019/0202489 A1 | * | 7/2019 | Muehling | F16C 35/02 |
| 2020/0140002 A1 | * | 5/2020 | James | F16F 1/185 |
| 2020/0332878 A1 | * | 10/2020 | Hafermalz | F16C 23/08 |
| 2021/0269082 A1 | * | 9/2021 | Negishi | F16C 33/128 |
| 2022/0032992 A1 | * | 2/2022 | Ko | B62D 3/126 |
| 2022/0281513 A1 | * | 9/2022 | Lee | B62D 15/0225 |
| 2023/0034783 A1 | * | 2/2023 | Span | B62D 3/126 |
| 2023/0134775 A1 | * | 5/2023 | Lee | B62D 3/126 280/93.5 |
| 2023/0399047 A1 | * | 12/2023 | Sung | B62D 5/0454 |

FOREIGN PATENT DOCUMENTS

| | | | | |
|---|---|---|---|---|
| CN | 112722058 A | * | 4/2021 | |
| CN | 117465539 A | * | 1/2024 | |
| DE | 102022114530 A1 | * | 12/2022 | B62D 3/123 |
| WO | WO-2014056570 A1 | * | 4/2014 | B62D 3/12 |

* cited by examiner

*Primary Examiner* — Paul N Dickson
*Assistant Examiner* — Maxwell L Meshaka
(74) *Attorney, Agent, or Firm* — Eleanor Musick; Torrey Pines Law Group PC (57) ABSTRACT

An improved steering rack assembly includes a rack housing and pinion case having a first bushing disposed over the rack at a location corresponding to the pinion. A cut-out in the bushing allows contact between the pinion and the rack while supporting the rack on either side of the pinion.

11 Claims, 8 Drawing Sheets

OFF-ROAD VEHICLE STEERING RACK ASSEMBLY

FIELD OF THE INVENTION

The present invention relates to a steering rack assembly for off-road vehicles with improved stabilization and shock load tolerance.

BACKGROUND

Steering rack assemblies convert rotational motion of the steering wheel into the linear motion needed to turn the vehicle wheels. A typical rack-and-pinion gearset is enclosed in a tubular metal housing, with each end of the rack protruding from the housing. A tie rod connects to each end of the rack. In a stock rack, a pinion gear and preload adjuster bear the steering load on the driver's side of the vehicle, while a linear/angular combination bears the steering load on the passenger side. Clearance fit bushings are present outboard of the pinion and linear bearing. Specifically, in a factory OEM rack system, the mesh between the rack and pinion is set by a spring and a plain bearing support. This allows the manufacturer to easily and quickly set rack and pinion backlash by giving the rack adjustment. During assembly the plain bearing is pushed into place, setting preload between the gears with a spring behind the bearing and a screw in cap to retain it. This spring loaded plain bearing sets and maintains mesh between the rack and pinion during use. In many vehicles, the housing is formed from cast aluminum. Minimal support within the housing for the rack and pinion facilitates assembly on a mass production scale and is well-suited for standard road and mild off-road applications with small tires. However, when used on vehicles that have been modified to use large tires for driving in challenging off-road conditions, catastrophic failure of the cast aluminum housing often occur, with fractures at the passenger size belt housing/end cap, and/or at the driver's side preload adjuster. When these failures occur, the clearance-fit bushings exhibit signs of wear from contact with the rack gear, indicating significant deflection of the gear prior to housing failure. Still, the gears and bearings appear to hold up well to the loads that have destroyed the rack housing, implicating the housing materials and the limited support within the housing as the failure points of the assembly.

Accordingly, the need exists for a modified steering rack assembly that employs different materials and support features to ensure integrity under the demands of extreme off-road driving. The present invention is directed to such an approach.

BRIEF SUMMARY

The inventive approach to solving the steering rack breakage involves two key components: (1) fabricating the housing from billet aluminum, which has greater strength and durability; and (2) supporting the rack on both ends by precision bushings that takes eccentric loading off of the gear set and bearings. The gear set backlash is set by precision machining rather than a preload adjuster in the stock designs. Using this approach there is no preload adjuster to blow out and the tight fit bushings minimize rack deflection.

The bushing on the pinion side is a long oil impregnated bronze bushing that features a cut out for the pinion to slip though. The result is that the rack bar is supported on both sides of the pinion as well as directly behind the mesh of the rack and pinion. This full support leads to a huge decrease in deflection, making the system stronger. We set gear backlash by machining all of the bores that locate the rack and pinion in relation to one another in a single operation on a very high end 5 axis machine. The result is a part that is so precise that there is no need for adjustment.

In one aspect, an improved steering rack assembly according to the inventive approach includes: a rack housing and pinion case, the rack housing configured to enclose a rack; and a first bushing configured to fit into a pinion housing and over the rack at a location corresponding to a pinion, the first bushing having two ends with a gap disposed between the two ends, the gap configured to provide a contact window through which a pinion engages the rack, wherein the first bushing is configured to fit closely within the pinion housing and has a length between the two ends configured to support the rack on either side of the pinion and distribute contact forces on the rack in a substantially uniform manner. The steering rack assembly may further include a second bushing disposed over the rack at a distal location corresponding to an opposite side of the rack housing. At least one of the bushings may be formed from an oil impregnated bronze sleeve, a plain bearing, or a sleeve bearing.

In some embodiments, the first bushing may be two separate bushing segments disposed over the rack with a gap therebetween to define the contact window. In some embodiments, the rack housing and pinion case may be machined from a billet aluminum material. The billet aluminum material may be 6061 aluminum.

In another aspect, the inventive approach provides a method for increasing steering rack stability by: fitting a first bushing into a pinion housing section of a steering rack housing, the first bushing having two ends with a gap disposed between the two ends, the gap configured to provide a contact window through which a pinion engages the rack, wherein the bushing has a length between the two ends configured to support the rack on either side of the pinion and distribute contact forces on the rack in a substantially uniform manner; and fitting a second bushing into a belt housing section of the steering rack housing. The method may further include machining the steering rack housing from a billet aluminum material. The billet aluminum material may be 6061 aluminum. In some embodiments, at least one of the bushings may be formed from an oil impregnated bronze sleeve, a plain bearing, or a sleeve bearing. In some embodiments, the first bushing includes two separate bushing segments disposed over the rack with a gap therebetween to define the contact window.

DETAILED DESCRIPTION OF EMBODIMENTS

Referring to FIGS. 2-5, the inventive approach to solving the steering rack breakage involves two key components: (1) fabricating the housing from billet aluminum, which has greater strength and durability; and (2) supporting the rack on both ends by precision bushings that takes eccentric loading off of the gear set and bearings. The gear set backlash is set by precision machining rather than a preload adjuster in the stock designs. Using this approach, there is no preload adjuster to blow out and the tight fit bushings minimize rack deflection.

In some embodiments, the housing is machined from 6061 billet aluminum. Table 1 below provides a comparison of the material characteristics of cast aluminum and 6061-T6 material.

TABLE 1

|  | Typical Cast Aluminum | 6061-T6 |
| --- | --- | --- |
| % Elongation at Break | 1-6% | 17% |
| Yield Strength | 15-30 ksi | 40 ksi |
| Tensile Strength | 25-35 ksi | 45 ksi |

1 ksi = 1,000 pounds/square inch

While 6061 billet is described as being used to fabricate the housing components, it will be apparent to those of skill in the art that other types of material with similar strength and durability qualities may also be used. In other embodiments, the housing components may be cast, molded, or fabricated using other known manufacturing technologies.

Figure 1A:
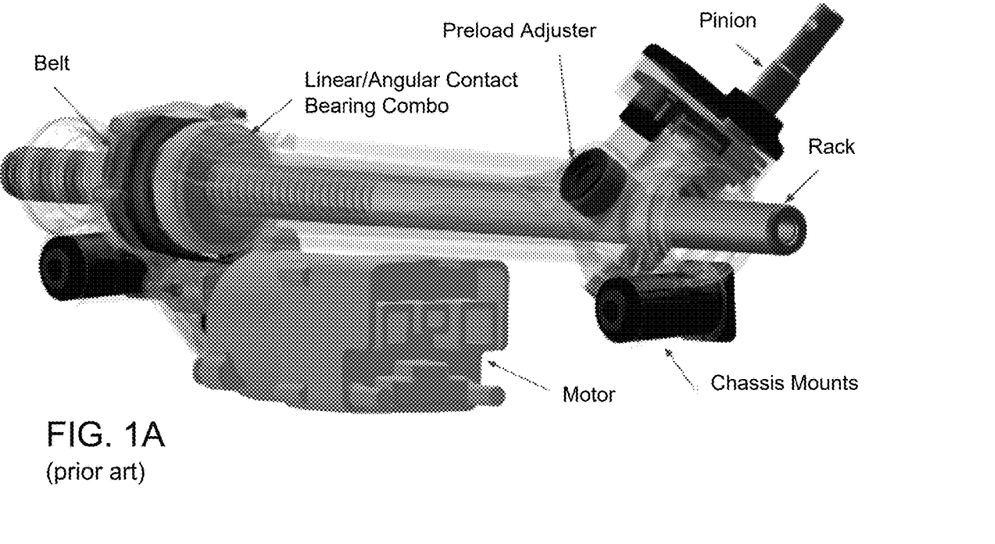
FIGS. 1A and 1B are front and rear perspective views of a conventional prior art steering rack assembly.
Figure 1B:
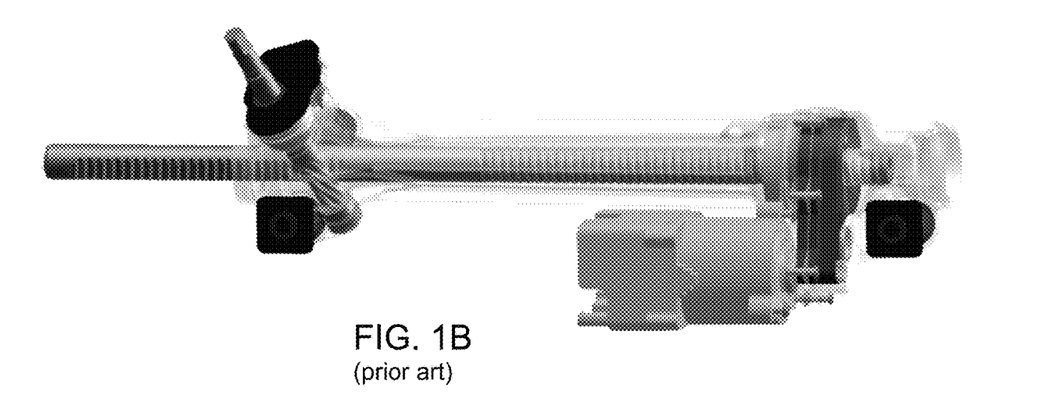
Figure 2:
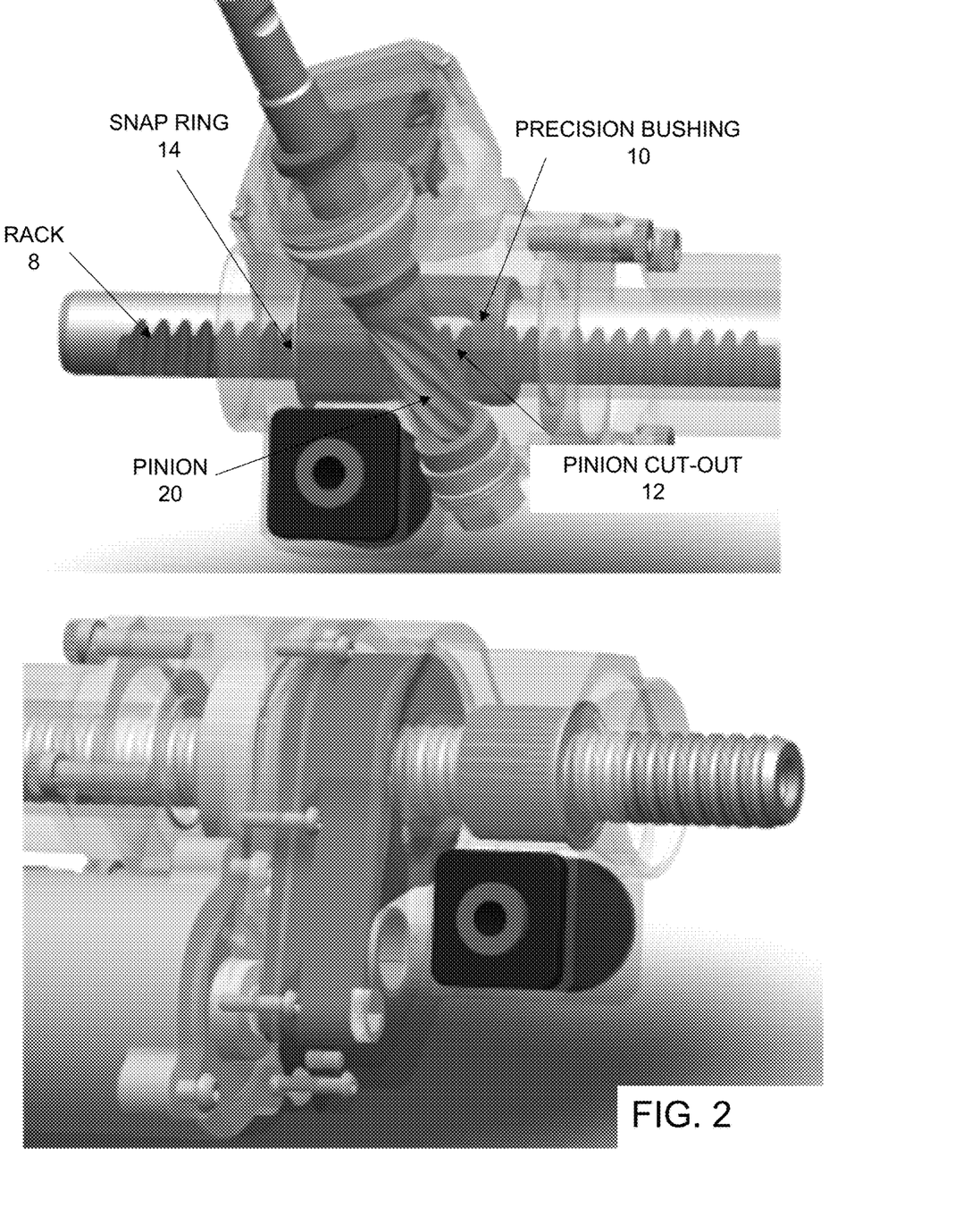
FIG. 2 provides 3D perspective views of the driver and passenger ends of a steering rack assembly according to an embodiment of the invention.
Figure 3:
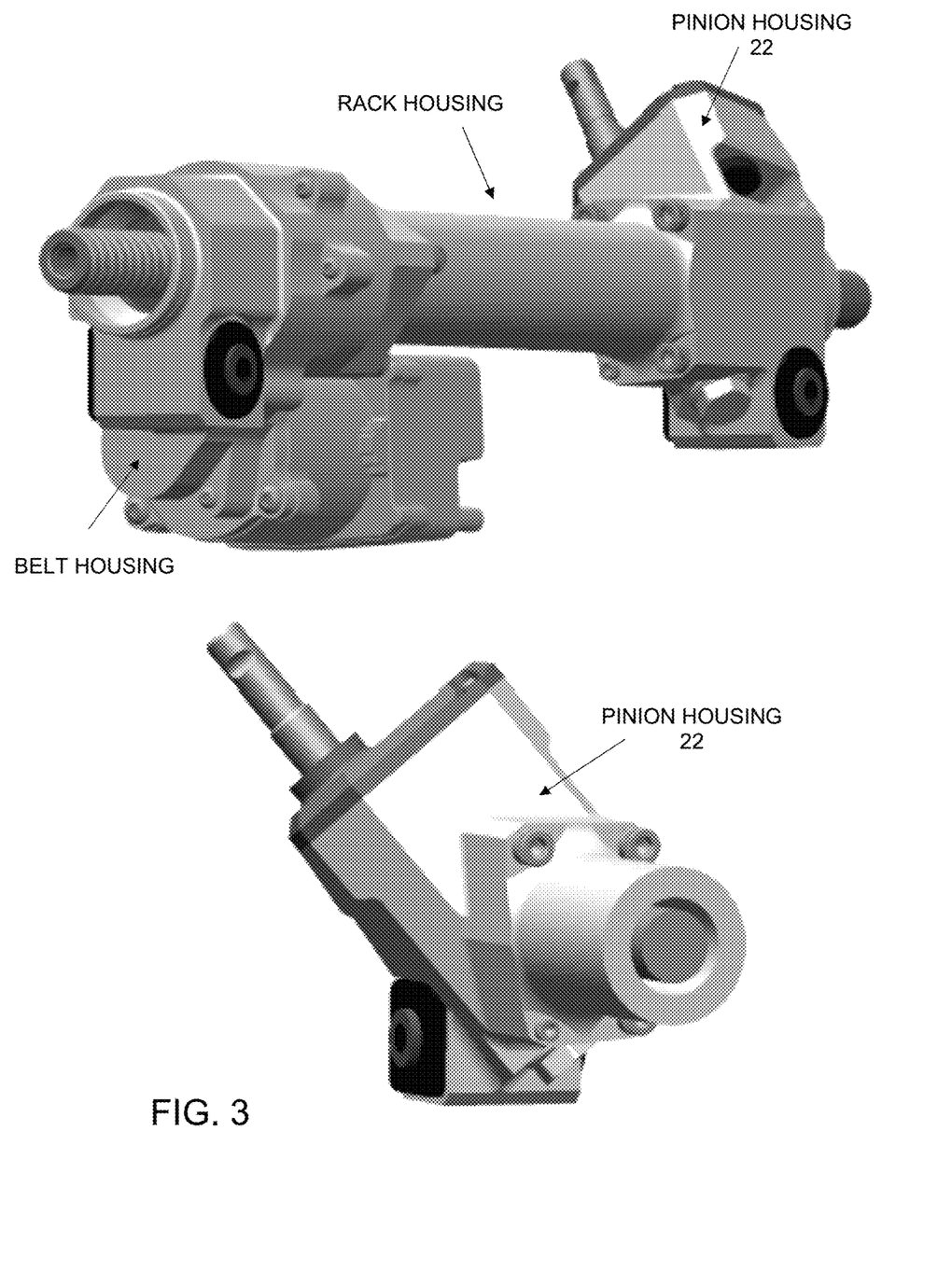
FIG. 3 provides rear and side perspective views of a steering rack assembly according to an embodiment of the invention.
Figure 4A:
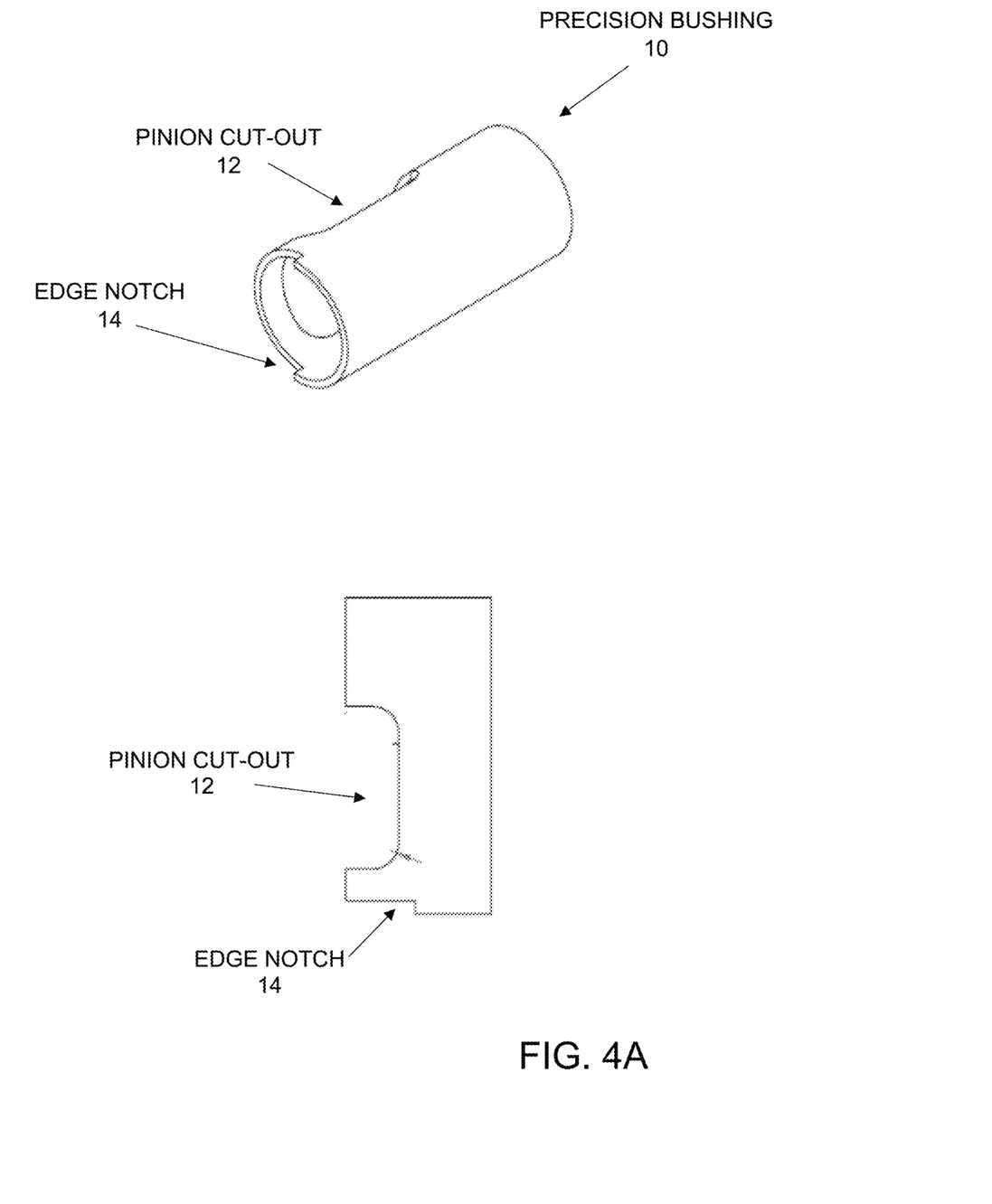
FIG. 4A provides perspective and top views of a precision bronze bushing according to a first embodiment of the invention.

Referring to FIG. 4A, which diagrammatically illustrates a first embodiment of the inventive approach, the bushing 10 on the pinion side is a (relatively) long oil impregnated bronze bushing that features a gap or cut out 12 for the pinion 20 to slip through to allow it to engage with the rack 8. The length of the bushing 10 helps distribute contact forces over a broader area than is possible with existing designs, with the key being that the forces are distributed on both sides of the pinion. The bushing 10 is retained in the bushing bore 18 in the housing 22 using a special retaining compound. The bushing 10 is slip fit into the aluminum housing 22 (Shown in FIG. 5) and becomes a slight press fit at the bottom of the housing. A snap ring 14 may be used to further secure the bushing within the housing. An edge notch 14 shown in FIG. 4 located at one end of the bushing body facilitates mating with a tab or similar feature with an inverse shape within the housing 22 to permit proper indexing of the bronze to prevent incorrect installation and to keep the bushing in place to ensure that the bronze cannot spin within the housing. If the bushing 10 were to rotate, the teeth of the rack could potentially become a broach and shred the bronze. Alternative approaches for keeping the bushing from rotating will be apparent to those in the art.

Figure 4B:
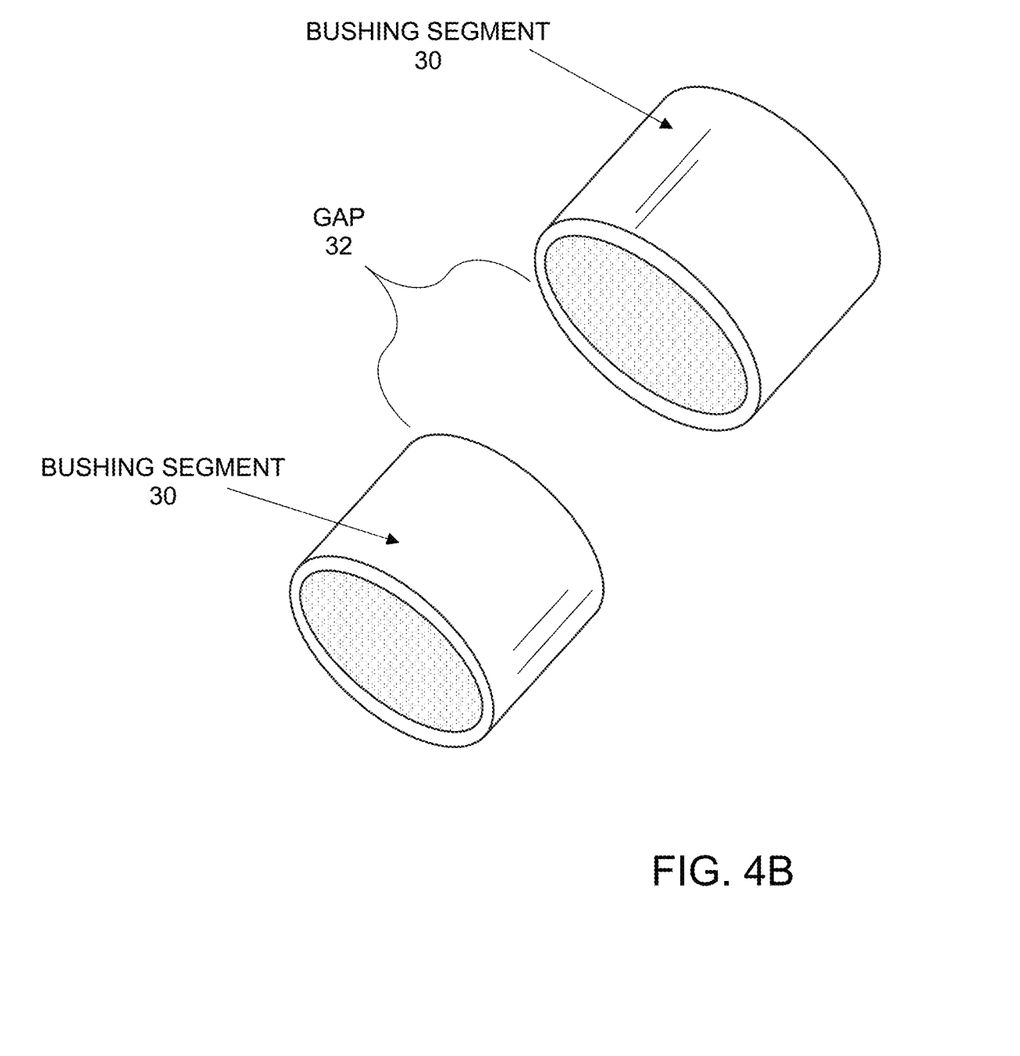
FIG. 4B is a diagrammatic perspective view of a second embodiment of the bushing.
Figure 5:
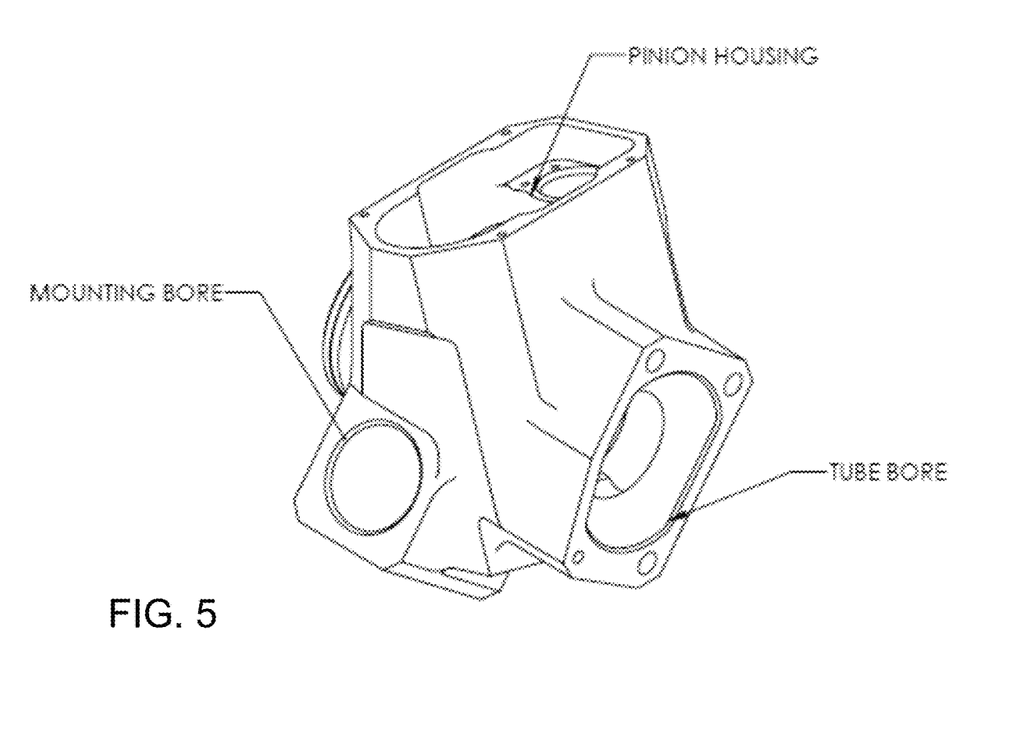
FIG. 5 provides multiple views and details of the pinion housing according to an embodiment of the invention.

In the alternative embodiment shown in FIG. 4B, a two piece implementation of the bushing provides substantially the same function as the bushing shown in FIG. 4A with a simpler and more economical construction. Here, two separate bushing segments 30 provide the combined function of the bushing 10 to distribute the forces over a broader area of the rack. The gap 32 between the segments serves the same function as the pinion cut-out 12, allowing the pinion to engage with the rack without interference. While it may be used, an end notch is not require since axial rotation around the rack will not interference with pinion engagement. The outer ends of one or both bushing segment may be secured within the housing using snap rings (not shown). The dimensions of the bushing segments are selected optimize the uniform force distribution across the rack while still fitting within the pinion housing. The two segments need not have the same lengths and will be determined by the dimensions of the housing.

In some embodiments, the bushing may be made from SAE 841 bearing bronze by purchasing a commercially available oil impregnated bronze sleeve, e.g., AA-1332-8 (1.127 in. I.D.×1.377 in. O.D.×3 in.), which is machined to form the pinion cut-out and semi-circular notch as indicated in the figure. As shown in Section E-E of FIG. 5, the bushing fits closely within the bushing bore of the pinion case. The result is that the rack bar is supported on both sides of the pinion as well as directly behind the mesh of the rack and pinion.

On the distal side of the rack near the belt housing, a similar bushing of the same type (oil impregnated bronze) is fitted within the housing, over the rack, to expand the potential contact area between the rack and the inner surface of the rack housing. While this bushing does not require a precision cut-out for the pinion, it may similarly employ an edge notch for proper placement during installation. In some embodiments, the bushing may be spring loaded to maintain proper positioning. The expanded support area leads to a significant decrease in deflection, resulting in the overall system being stronger. Gear backlash is set by machining all of the bores that locate the rack and pinion in relation to one another in a single operation on a very high end five-axis machine. The result is a component that is so precise that there is no need for adjustment.

The foregoing description and accompanying drawings provide illustrative examples of a steering rack that incorporate the principles of the invention. These examples are not intended to be limiting, and it will be readily apparent to those in the art that different permutations and combinations of the components features described herein may be made that still fall within the scope of the invention.

The invention claimed is:

1. An improved steering rack assembly comprising:
   a rack housing and pinion case, the rack housing configured to enclose a rack; and
   a bushing configured to fit into a pinion housing and over the rack at a location corresponding to a pinion, the bushing having two ends with a gap disposed between the two ends, the gap configured to provide a contact window through which a pinion engages the rack, wherein the bushing is configured to fit closely within the pinion housing and has a length between the two ends configured to support the rack on either side of the pinion and distribute contact forces on the rack in a substantially uniform manner.

2. The steering rack assembly of claim 1, further comprising a second bushing disposed over the rack at a distal location corresponding to an opposite side of the rack housing.

3. The steering rack assembly of claim 1, wherein at least one of the bushings is formed from an oil impregnated bronze sleeve, a plain bearing, or a sleeve bearing.

4. The steering rack assembly of claim 1, wherein the bushing comprises two separate bushing segments disposed over the rack with a gap therebetween to define the contact window.

5. The steering rack assembly of claim 1, wherein the rack housing and pinion case are machined from a billet aluminum material.

6. The steering rack assembly of claim 5, wherein the billet aluminum material is 6061 aluminum.

7. A method for increasing steering rack stability, the method comprising:
   fitting a first bushing into a pinion housing section of a steering rack housing, the first bushing having two ends with a gap disposed between the two ends, the gap configured to provide a contact window through which a pinion engages the rack, wherein the bushing has a length between the two ends configured to support the rack on either side of the pinion and distribute contact forces on the rack in a substantially uniform manner; and
   fitting a second bushing into a belt housing section of the steering rack housing.

8. The method of claim 7, further comprising machining the steering rack housing from a billet aluminum material.

9. The method of claim 8, wherein the billet aluminum material is 6061 aluminum.

10. The method of claim 7, wherein at least one of the bushings is formed from an oil impregnated bronze sleeve, a plain bearing, or a sleeve bearing.

11. The method of claim 7, wherein the first bushing comprises two separate bushing segments disposed over the rack with a gap therebetween to define the contact window.

\* \* \* \* \*